(12) United States Patent
Huang et al.

(10) Patent No.: US 10,967,360 B2
(45) Date of Patent: Apr. 6, 2021

(54) GELS FOR REMOVING AIR POLLUTANTS

(71) Applicant: Honeywell International Inc., Morris Plains, NJ (US)

(72) Inventors: Kai Huang, Shanghai (CN); Marilyn Wang, Shanghai (CN); Xingping Wang, Shanghai (CN); Jack Yu, Shanghai (CN); Wesley Nie, Shanghai (CN); Hailin Liu, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 615 days.

(21) Appl. No.: 15/811,245

(22) Filed: Nov. 13, 2017

(65) Prior Publication Data

US 2019/0143302 A1 May 16, 2019

(51) Int. Cl.
| | |
|---|---|
| *B01J 20/28* | (2006.01) |
| *B01J 20/24* | (2006.01) |
| *B01J 20/10* | (2006.01) |
| *B01J 20/04* | (2006.01) |
| *B01D 53/72* | (2006.01) |
| *B01D 53/81* | (2006.01) |
| *B01D 53/02* | (2006.01) |

(52) U.S. Cl.
CPC ........ *B01J 20/28047* (2013.01); *B01D 53/02* (2013.01); *B01D 53/72* (2013.01); *B01D 53/81* (2013.01); *B01J 20/046* (2013.01); *B01J 20/048* (2013.01); *B01J 20/103* (2013.01); *B01J 20/24* (2013.01); *B01D 2251/304* (2013.01); *B01D 2251/306* (2013.01); *B01D 2251/61* (2013.01); *B01D 2251/90* (2013.01); *B01D 2253/102* (2013.01); *B01D 2253/106* (2013.01); *B01D 2253/108* (2013.01); *B01D 2253/202* (2013.01); *B01D 2253/25* (2013.01); *B01D 2257/708* (2013.01); *B01J 2220/46* (2013.01)

(58) Field of Classification Search
CPC .... B01J 20/28; B01J 20/28047; B01J 20/046; B01J 20/048; B01J 20/103; B01J 20/24; B01J 2220/46; B01D 53/72; B01D 53/81; B01D 2251/304; B01D 2251/306; B01D 2251/61; B01D 2251/90; B01D 2253/106; B01D 2257/708
USPC ........................................ 502/401
See application file for complete search history.

(56) References Cited

U.S. PATENT DOCUMENTS

| | | | | |
|---|---|---|---|---|
| 2011/0091955 A1* | 4/2011 | Constantz | ................ | F23J 15/04 435/168 |
| 2017/0106333 A1* | 4/2017 | Zhu | .................... | B01D 53/1406 |

* cited by examiner

*Primary Examiner* — Edward M Johnson
(74) *Attorney, Agent, or Firm* — Schwegman Lundberg & Woessner, P.A.

(57) ABSTRACT

Gels that can react with air pollutants in air and methods for making said gels, are provided. The gels are useful for removing air borne pollutants from indoor environments.

20 Claims, No Drawings

GELS FOR REMOVING AIR POLLUTANTS

Rapid economic development in many countries has resulted in increased environmental pollution. In particular, indoor environmental pollution caused by the use of various chemicals associated with the production of items such as decorative materials, furniture, tobacco, and household appliances is of growing concern. Many of the appliances, furnishings, and painted surfaces found in new home constructions release volatile organic compounds (VOCs). VOCs include hydrocarbons, carbonyl compounds, organic acids, organic peroxides, organic sulfur compounds, organic halides, and the like. VOCs can also participate in photochemical reaction with nitrogen oxides and sulfides of the atmosphere upon exposure to light and form highly toxic photochemical smog.

Many VOCs have been found to be carcinogenic or suspected carcinogens (such as formaldehyde, benzene, tetrachloroethylene, trichloroethane, trichlorethylene, and the like). Major emission sources of indoor air VOCs include wall coatings (e.g., paint and wallpaper) and oil paints and varnishes for furniture. However, recently, houses have become more and more airtight and, accordingly, VOCs can result in more serious health issues because they cannot rapidly escape the indoor environment.

Products for removing formaldehyde are generally divided into two categories: (1) a variety of sprays that can be sprayed on the surface of furniture, walls and other sources of pollution; and (2) hydrogel products placed indoors. These two types of products are always used as a consumable during the formaldehyde-removing process. Currently available hydrogel products for removing formaldehyde on the market have hydrogel networks of polymer chains that contain over 90% water, which limits the adsorption of formaldehyde.

SUMMARY OF THE INVENTION

In various embodiments, a gel for removing one or more air pollutants from air includes at least one polymer, at least one adsorbent, at least one chelating agent, at least one component that reacts with at least one air pollutant, and water.

In various embodiments, a gel for removing air pollutants from air includes about 1 to about 10 wt % of carageenan, about 1 to about 10 wt % of porous silica, about 0.1 to 5 wt % of potassium chloride, about 0.1 to 5 wt % of sodium hexametaphosphate, about 0.1 to 5 wt % of aminoethanesulfonic acid, and water.

Adsorption of low airborne concentrations (<1 ppm) of formaldehyde followed by reaction of the adsorbed formaldehyde with a formaldehyde scavenger can efficiently remove formaldehyde from the air and environment. In various embodiments, the combinative effect of the adsorbent and the scavenger can be synergistic. Owing to the superior adsorption performance of the gel, the gel can adsorb formaldehyde and other VOCs quickly and effectively, and the scavenger more easily reacts with the adsorbed formaldehyde at least in part due to the immobilization or partial immobilization of the formaldehyde in the adsorbent compared to the reaction of the scavenger alone. Additionally, in various embodiments, the gel can effectively remove a variety of unpleasant odors from the environment.

Compared to existing products, various embodiments of the gel offers a number of advantages. Various embodiments of the gel use an effective adsorbent and formaldehyde scavenger to rapidly capture formaldehyde from the air and thoroughly react with the formaldehyde to remove it. Various embodiments of the reaction product thereof are stable, non-toxic, and do not cause secondary pollution. In various embodiments, the gel is convenient and easy to use because the gel can react with the formaldehyde at room temperature and atmospheric pressure. Various embodiments of the gel have excellent moisture-retention, providing long-term effective removal of formaldehyde. In various embodiments, due to the high solubility of formaldehyde in water, water in the gel can act as an absorbing agent that facilitates adsorption as well. In addition to formaldehyde, various embodiments of the gel can also remove a variety of unpleasant odors such as bathroom odors, cooking odors, new car smell, pet odors, smoke, chemical taste, musty odors, disinfectant odors, shoe odors, paint odors, silicone rubber odors and the like.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not only about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y." unless indicated otherwise. Likewise, the statement "about X, Y, or about Z" has the same meaning as "about X, about Y, or about Z," unless indicated otherwise.

In this document, the terms "a." "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Gels for Removing Air Pollutants

In various embodiments, a gel for removing one or more air pollutants from air, includes at least one polymer, at least one adsorbent, at least one chelating agent, at least one component reactive with at least one air pollutant, and water.

The gel can be a hydrogel. The water content of the hydrogel can be about 1 to 95 wt %, 1 to 90 wt %, 1 to 85 wt %, 1 to 80 wt %, 1 to 75 wt %, 1 to 70 wt %, 1 to 65 wt %, 1 to 60 wt %, 1 to 55 wt %, 1 to 50 wt %, 1 to 45 wt %, 1 to 40 wt %, 1 to 35 wt %, 1 to 30 wt %, 1 to 25 wt %, 1 to 20 wt %, 1 to 15 wt %, 1 to 10 wt %, 1 to 5 wt %, or any range or sub-range between these values. The water content of the hydrogel can be about 95 wt %, 90 wt %, 85 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 9 wt %, 7 wt %, 6 wt %, 5 wt %, 4, wt %, 3 wt %, 2 wt %, 1 wt %, or any range or sub-range between these values. Various embodiments of the gel have a water content of about 80 to about 92 wt %. The hydrogel can also be subjected to freeze-drying or drying with supercritical fluid such as $CO_2$. In some embodiments, the hydrogel is freeze-dried and has a water content of about 1 to about 15 wt %.

In various embodiments, the at least one polymer is chosen from acacia, gelatin, carrageenan, locust bean gum, konjac gum, xanthan gum, starch, cyclodextrin, sodium alginate, chitosan, carboxymethyl chitosan, polyvinyl alcohol, polyurea, and mixtures thereof. In various embodiments, the at least one polymer is carrageenan.

In various embodiments, the at least one polymer is about 1 to 30 wt % of the gel. The at least one polymer can be about 1 to 25 wt %, 1 to 20 wt %, 1 to 15 wt %, 1 to 10 wt %, 1 to 9 wt %, 1 to 8 wt %, 1 to 7 wt %, 1 to 6 wt %, 1 to 5 wt %, 1 to 4 wt %, 1 to 3 wt %, or 1 to 2 wt % of the gel. The at least one polymer can be about 30 wt %, 25 wt %, 20 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt % of the gel, or any range or sub-range between any of these values.

In various embodiments, the at least one adsorbent is chosen from porous silica, zinc ricinoleate, polyacrylamide, activated carbon, a molecular sieve, and mixtures thereof. The molecular sieve can be a zeolite or a metal organic framework material. Suitable zeolites can include zeolites having a natrolite framework (NAT), Edingtonite framework (EDI), thomsonite framework (THO), analcime framework (ANA), laumontite (LAU), phillipsite framework (PHI), gismondine framework (GIS), boggsite (BOG), merlinoite (MER), mazzite-series (MAZ), paulingite-series (PAU), perlialite (Linde type L framework, zeolite L, LTL), chabazite framework (CHA), faujasite framework (FAU), linde type X (zeolite X, X zeolites), Linde type Y (zeolite Y. Y zeolites), mordenite framework (MOR), Offretite-wenkite subgroup. Heulandite framework (HEU), stilbite framework (STI), or a bewsterite framework (BRE), In various embodiments, the adsorbent is porous silica. Porous silica can be mesoporous silica or mesoporous silica nanoparticles (MSNs).

The porous silica can have pores ranging in size from 0.5 nm to 40 nm, as measured by the largest cross-sectional dimension of the pores, and can include, without limitation, porous silica materials such as MCM, SBA-15, TUD-1, HMM-33, and FSM-16. The pore size can be an average pore size, such that the average of the largest cross-sectional dimension of the pores is 0.5 nm to 40 nm. The porous silica can have pore sizes ranging from about 0.5 nm to 40 nm, 5 nm to 40 nm, 1 nm to 35 nm, 5 nm to 35 nm, 5 nm to 30 nm, 10 nm to 30 nm, 10 nm to 25 nm, 10 nm to 20 nm, 15 nm to 20 nm, or any range or sub-range between these values. The porous silica can have a pore size of 40 nm, 35 nm, 30 nm, 28 nm, 26 nm, 24, nm, 22 nm, 20 nm, 19 nm, 18 nm, 17 nm, 16 nm, 15 nm, 14 nm, 13 nm, 12 nm, 11 nm, 10 nm, 8 nm, 6 nm, 4 nm, 2 nm, 1 nm, 0.5 nm, or any range or sub-range between these values. In various embodiments, the porous silica has a pore size of about 10 to about 20 nm.

The surface area of the porous silica can be from about 200 $m^2$/g to 3000 $m^2$/g, 200 $m^2$/g to 2800 $m^2$/g, 200 $m^2$/g to 2600 $m^2$/g, 200 $m^2$/g to 2400 $m^2$/g, 200 $m^2$/g to 2200 $m^2$/g, 200 $m^2$/g to 2000 $m^2$/g, 200 $m^2$/g to 1800 $m^2$/g, 200 $m^2$/g to 1600 $m^2$/g, 200 $m^2$/g to 1400 $m^2$/g, 200 $m^2$/g to 1200 $m^2$/g, 200 $m^2$/g to 1000 $m^2$/gm, 200 $m^2$/g to 800 $m^2$/g, 200 $m^2$/g to 600 $m^2$/g, 200 $m^2$/g to 400 $m^2$/g, or any range or sub-range between these values. In various embodiments, the porous silica adsorbent has a surface area of about 3000 $m^2$/g, 2800 $m^2$/g, 2700 $m^2$/g, 2600 $m^2$/g, 2500 $m^2$/g, 2400 $m^2$/g, 2300 $m^2$/g, 2200 $m^2$/g, 2100 $m^2$/g, 2000 $m^2$/g, 1800 $m^2$/g, 1600 $m^2$/g, 3000 $m^2$/g, 1400 $m^2$/g, 1200 $m^2$/g, 1000 $m^2$/g, 800 $m^2$/g, 600 $m^2$/g, 400 $m^2$/g, 200 $m^2$/g, or any range or sub-range between these values. In various embodiments, the porous silica has a pore size of 2200 $m^2$/g.

In various embodiments, the at least one adsorbent is about 1 to about 30 wt % of the gel. The at least one adsorbent can be about 1 to 25 wt %, 1 to 20 wt %, 1 to 15 wt %, 1 to 10 wt %, 1 to 9 wt %, 1 to 8 wt %, 1 to 7 wt %, 1 to 6 wt %, 1 to 5 wt %, 1 to 4 wt %, 1 to 3 wt %, or 1 to 2 wt % of the gel. The at least one adsorbent can be about 30 wt %, 25 wt %, 20 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt % of the gel, or any range or sub-range between any of these values.

In various embodiments, the at least one chelating agent can be chosen from sodium tripolyphosphate, sodium polyphosphate, sodium hexametaphosphate, sodium pyrophosphate, nitrilotriacetic acid, diethylene triamine pentaacetic acid, ethylene glycol-bis-(3-aminoethyl ether)-N,N-tetraacetic acid, tetrasodium vinoxy diphosphate, aminotrimethylene phosphonate, and mixtures thereof. In various embodiments, the chelating agent is sodium hexametaphosphate.

The at least chelating agent can be about 0.01 to about 20 wt % of the gel. The at least one chelating agent can be about 0.01 to 15 wt %, 0.01 to 10 wt %, 0.01 to 9 wt %, 0.01 to 8 wt %, 0.01 to 7 wt %, 0.01 to 6 wt %, 0.01 to 5 wt %, 0.01 to 4 wt %, or 0.01 to 3 wt % of the gel. The at least one chelating agent can be about 20 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt %, 0.5 wt %, 0.25 wt %, 0.1 wt %, 0.05 wt % of the gel, or any range or sub-range between any of these values. In various embodiments, the at least chelating agent is present in an amount of 0.1 to 5 wt % of the gel.

The air pollutant can include at least one volatile organic compound (VOC), such as formaldehyde, benzene, toluene, xylene, para-dichlorobenzene, ethyl benzene, styrene, acetaldehyde, cyclohexanone, isophorone, methanol, ethanol, phenol, acetone, ethyl acetate, n-butanol, methyl isobutyl ketone, n-butyl acetate, acetophenone, methyl ethyl ketone, isopropyl alcohol, dichloromethane, trichloroethylene, n-hexane, 2-methoxyethyl acetate, nitrobenzene, bis-(2-methyoxyethyl)ether, 1,3,5-trimethylbenzene, and mixtures thereof. In various embodiments, the VOC is formaldehyde.

In various embodiments, the at least one component reactive with at least one air pollutant is chosen from 2-(diethanolamino) ethanesulfonic acid, aminoethanesulfonic acid, trimethylolmethylaminoethanesulfonic acid, N-(2-acetylamino)-2-aminoethanesulfonate, adipic acid dihydrazide, propionyl hydrazide, trimethylolaminomethane, ammonium sulfate, diethylenetriamine, triethyleneteramine, methyl acetoacetate, dimethyl malonate esters, and mixtures thereof. In various embodiments, the at least one component reactive with at least one air pollutant is aminoethanesulfonic acid.

The at least one component reactive with at least one air pollutant can be about 0.01 to about 20 wt % of the gel. The at least one component reactive with at least one air pollutant can be about 0.01 to 15 wt %, 0.01 to 10 wt %, 0.01 to 9 wt %, 0.01 to 8 wt %, 0.01 to 7 wt %, 0.01 to 6 wt %, 0.01 to 5 wt %, 0.01 to 4 wt %, or 0.01 to 3 wt % of the gel. The at least one component reactive with at least one air pollutant can be about 20 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt %, 0.5 wt %, 0.25 wt %, 0.1 wt %, 0.05 wt % of the gel, or any range or sub-range between any of these values. In various embodiments, the at least one component reactive with at least one air pollutant is present in an amount of 0.1 to 5 wt % of the gel.

In various embodiments, the gel can further include a crosslinking agent. The crosslinking can be chosen from sodium chloride, magnesium chloride, potassium chloride, barium chloride, magnesium sulfate, sodium sulfate, potassium sulfate, potassium hydrogen sulfate, sodium carbonate, potassium carbonate, potassium hydrogen carbonate, sodium bicarbonate, magnesium carbonate, and mixtures thereof. The crosslinking agent can give the gel more rigidity when incorporated in its matrix. In various embodiments, the crosslinking agent is potassium chloride.

The crosslinking agent can be about 0.01 to about 20 wt % of the gel. The crosslinking agent can be about 0.01 to 15 wt %, 0.01 to 10 wt %, 0.01 to 9 wt %, 0.01 to 8 wt %, 0.01 to 7 wt %, 0.01 to 6 wt %, 0.01 to 5 wt %, 0.01 to 4 wt %, or 0.01 to 3 wt % of the gel. The crosslinking agent can be about 20 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt %, 0.5 wt %, 0.25 wt %, 0.1 wt %, 0.05 wt % of the gel, or any range or sub-range between any of these values. In various embodiments, crosslinking agent is present in an amount of 0.1 to 5 wt % of the gel.

Methods of Making Gels

In various embodiments a method of making a gel that can remove air pollutants from air includes combining the at least one polymer, the at least one adsorbent, the at least one chelating agent, and the at least one component reactive with at least one air pollutant to form an embodiment of the formaldehyde-removing gel described herein. In various embodiments, the combining includes adding the at least one polymer to water to form a mixture and heating the mixture at a temperature of 40 to 95° C. adding the at least one adsorbent, the at least one chelating agent, and the at least one component capable of reacting with at least one air pollutant to the mixture to form a final mixture, and transferring the final mixture into a container to form the gel.

The heating of the at least one polymer in water can be performed at a temperature of 40° C., 45° C., 50° C., 55° C., 60° C., 65° C., 70° C., 75° C., 80° C., 85° C., 90° C., or any range or sub-range between these values. The final mixture can be stirred for about 10 to 30 min before being transferred into a container. In various embodiments, the final mixture can be stirred for about 10 min, 15 min, 20 min. 25, min, 30 min, or any range or sub-range between these values, before being transferred into a container. The container is any suitable container that is chemically compatible with the final mixture such as a borosilicate glass container. The transfer of the final mixture into the container is a rapid transfer, such that the final mixture is transferred to the container in about 1 to 30 seconds. A rapid transfer to the container ensures that the viscosity of the gel does not significantly increase. If a transfer is performed too slowly, the temperature of the gel decreases, the viscosity increases, and the liquidity of the gel deteriorates.

In various embodiments, a gel for removing air pollutants from air includes about 1 to about 10 wt % of carageenan, about 1 to about 10 wt % of porous silica, about 0.1 to about 5 wt % of potassium chloride, about 0.1 to about 5 wt % of sodium hexametaphosphate, about 0.1 to about 5 wt % of aminoethanesulfonic acid, and water.

In various embodiments, a method of removing one or more air pollutants from air includes contacting the gel with air. Contacting the gel with air can include both allowing air to passively pass over the gel as well as actively passing air over the gel. Actively passing air over the gel can include any suitable method for moving air through or over the gel, such as with a fan, blower, or forced air induction.

EXAMPLES

Various embodiments of the present invention can be better understood by reference to the following Examples which are offered by way of illustration. The present invention is not limited to the Examples given herein.

Example 1

Carrageenan (50 g, 5 wt %, wherein wt %'s in this Example designate total wt % of the final mixture, CAS NO: 9000-07-1 from Sigma-Aldrich) was added to ion-exchanged water (840 mL, 84 wt %), mixed well then heated to 40-95° C. with stirring to form a mixture. Porous silica (50 g, 5 wt %, average pore size 10-20 nm, 2200 m²/g surface area, Sigma-Aldrich), potassium chloride (10 g, 1 wt %, Sigma-Aldrich), sodium hexametaphosphate (20 g, 2 wt %, Evonik Industries AG) and aminoethanesulfonic acid (30 g, 3 wt %, Sigma-Aldrich) were then added to the mixture, and stirred for 10-30 min to form a final mixture. The final mixture was then rapidly transferred to a target container to form the gel.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Enumerated Embodiments

The following exemplary embodiments are provided, the numbering of which is not to be construed as designating levels of importance:

Embodiment 1 provides a gel for removing one or more air pollutants from air, comprising: at least one polymer; at least one adsorbent; at least one chelating agent; at least one component that reacts with at least one air pollutant; and water.

Embodiment 2 provides the gel of embodiment 1, wherein the gel is a hydrogel.

Embodiment 3 provides the gel of any one of embodiments 1-2, wherein the polymer is chosen from acacia, gelatin, carrageenan, locust bean gum, konjac gum, xanthan gum, starch, cyclodextrin, sodium alginate, chitosan, carboxymethyl chitosan, polyvinyl alcohol polyurea, and mixtures thereof.

Embodiment 4 provides the gel of any one of embodiments 1-3, wherein the at least one polymer is about 1 to about 30 wt % of the gel.

Embodiment 5 provides the gel of any one of embodiments 1-4, wherein the at least one adsorbent is chosen from porous silica, zinc ricinoleate, polyacrylamide, activated carbon, a molecular sieve, and mixtures thereof.

Embodiment 6 provides the gel of any one of embodiments 1-5, wherein the at least one adsorbent is about 1 to about 30 wt % of the gel.

Embodiment 7 provides the gel of any one of embodiments 1-6, wherein the at least one chelating agent is chosen from sodium tripolyphosphate, sodium polyphosphate, sodium hexametaphosphate, sodium pyrophosphate, nitrilotriacetic acid, diethylene triamine pentaacetic acid, ethylene glycol-bis-(β-aminoethyl ether)-N, N-tetraacetic acid, tetrasodium vinoxy diphosphate, aminotrimethylene phosphonate, and mixtures thereof.

Embodiment 8 provides the gel of any one of embodiments 1-7, wherein the at least chelating agent is about 0.01 to about 20 wt % of the gel.

Embodiment 9 provides the gel of any one of embodiments 1-8, wherein the air pollutant comprises at least one volatile organic compound (VOC).

Embodiment 10 provides the gel of any one of embodiments 1-9, wherein the VOC is formaldehyde, benzene, toluene, xylene, para-dichlorobenzene, ethyl benzene, styrene, acetaldehyde, cyclohexanone, isophorone, methanol, ethanol, phenol, acetone, ethyl acetate, n-butanol, methyl isobutyl ketone, n-butyl acetate, acetophenone, methyl ethyl ketone, isopropyl alcohol, dichloromethane, trichloroethylene, n-hexane, 2-methoxyethyl acetate, nitrobenzene, bis-(2-methyoxyethyl)ether, 1,3,5-trimethylbenzene, and mixtures thereof.

Embodiment 11 provides the gel of any one of embodiments 1-10, wherein the VOC is formaldehyde.

Embodiment 12 provides the gel of any one of embodiments 1-11, wherein the at least one component reactive with at least one air pollutant is chosen from 2-(diethanolamino) ethanesulfonic acid, aminoethanesulfonic acid, trimethylolmethylaminoethanesulfonic acid, N-(2-acetylamino)-2-aminoethanesulfonate, adipic acid dihydrazide, propionyl hydrazide, trimethylolaminomethane, ammonium sulfate, diethylenetriamine, triethylenetetramine, methyl acetoacetate, dimethyl malonate esters, and mixtures thereof.

Embodiment 13 provides the gel of any one of embodiments 1-12, wherein the at least one component reactive with at least one air pollutant is about 0.01 to about 20 wt % of the gel.

Embodiment 14 provides the gel of any one of embodiments 1-13, wherein the gel further comprises a crosslinking agent.

Embodiment 15 provides the gel of any one of embodiments 1-14, wherein the crosslinking is chosen from sodium chloride, magnesium chloride, potassium chloride, barium chloride, magnesium sulfate, sodium sulfate, potassium sulfate, potassium hydrogen sulfate, sodium carbonate, potassium carbonate, potassium hydrogen carbonate, sodium bicarbonate, magnesium carbonate, and mixtures thereof.

Embodiment 16 provides the gel of any one of embodiments 1-15, wherein the crosslinking agent is about 0.01 to about 20 wt % of the gel.

Embodiment 17 provides the gel of any one of embodiments 1-16, wherein the at least one polymer is carrageenan.

Embodiment 18 provides the gel of any one of embodiments 1-17, wherein the chelating agent is sodium hexametaphosphate.

Embodiment 19 provides the gel of any one of embodiments 1-18, wherein the at least one component reactive with at least one air pollutant is aminoethanesulfonic acid.

Embodiment 20 provides the gel of any one of embodiments 1-19, wherein the adsorbent is porous silica.

Embodiment 21 provides the gel of any one of embodiments 1-20, wherein the crosslinking agent is potassium chloride.

Embodiment 22 provides a method of making the gel of embodiments 1-21, comprising: combining the at least one polymer, the at least one adsorbent, the at least one chelating agent, and the at least one component reactive with at least one air pollutant to form the gel.

Embodiment 23 provides the method of any one of embodiments 22, wherein the combining comprises: adding the at least one polymer to water to form a mixture and heating the mixture at a temperature of 40 to 95° C.: adding the at least one adsorbent, the at least one chelating agent, and the at least one component capable of reacting with at least one air pollutant to the mixture to form a final mixture; transferring the final mixture into a container to form the gel.

Embodiment 24 provides a gel for removing air pollutants from air, comprising: about 1 to about 10 wt % of carrageenan; about 1 to about 10 wt % of porous silica; about 0.1 to about 5 wt % of potassium chloride; about 0.1 to about 5 wt % of sodium hexametaphosphate; about 0.1 to about 5 wt % of aminoethanesulfonic acid; and water.

Embodiment 25 provides a method of removing one or more air pollutants from air, comprising: contacting the gel of any one of embodiments 1-21 with air.

Embodiment 26 provides a method of making an apparatus for removing one or more air pollutants from air, comprising applying the gel of any one of embodiments 1-21 to a surface.

Embodiment 27 provides an apparatus for removing one or more air pollutants from air, comprising the gel of embodiments 1-21.

What is claimed is:

1. A gel for removing one or more air pollutants from air, comprising:
    at least one polymer;
    at least one adsorbent;
    at least one chelating agent chosen from sodium tripolyphosphate, sodium polyphosphate, sodium hexametaphosphate, sodium pyrophosphate, nitrilotriacetic acid, diethylene triamine pentaacetic acid, ethylene glycol-bis-(β-aminoethyl ether)-N,N-tetraacetic acid, tetrasodium vinoxy diphosphate, aminotrimethylene phosphonate, and mixtures thereof;
    at least one component that reacts with at least one air pollutant; and
    water.

2. The gel of claim 1, wherein the gel is a hydrogel.

3. The gel of claim 1, wherein the polymer is chosen from acacia, gelatin, carrageenan, locust bean gum, konjac gum, xanthan gum, starch, cyclodextrin, sodium alginate, chitosan, carboxymethyl chitosan, polyvinyl alcohol, polyurea, and mixtures thereof.

4. The gel of claim 3, wherein the at least one polymer is about 1 to about 30 wt % of the gel.

5. The gel of claim 1, wherein the at least one adsorbent is chosen from porous silica, zinc ricinoleate, polyacrylamide, activated carbon, a molecular sieve, and mixtures thereof.

6. The gel of claim 5, wherein the at least one adsorbent is about 1 to about 30 wt % of the gel.

7. The gel of claim 1, wherein the at least chelating agent is about 0.01 to about 20 wt % of the gel.

8. The gel of claim 1, wherein the air pollutant comprises at least one volatile organic compound (VOC).

9. The gel of claim 8, wherein the VOC is formaldehyde, benzene, toluene, xylene, para-dichlorobenzene, ethyl benzene, styrene, acetaldehyde, cyclohexanone, isophorone, methanol, ethanol, phenol, acetone, ethyl acetate, n-butanol, methyl isobutyl ketone, n-butyl acetate, acetophenone, methyl ethyl ketone, isopropyl alcohol, dichloromethane, trichloroethylene, n-hexane, 2-methoxyethyl acetate, nitrobenzene, bis-(2-methyoxyethyl)ether, 1,3,5-trimethylbenzene, and mixtures thereof.

10. The gel of claim 1, wherein the at least one component reactive with at least one air pollutant is chosen from 2-(diethanolamino) ethanesulfonic acid, aminoethanesulfonic acid, trimethylolmethylaminoethanesulfonic acid, N-(2-acetylamino)-2-aminoethanesulfonate, adipic acid dihydrazide, propionyl hydrazide, trimethylolaminomethane, ammonium sulfate, diethylenetriamine, triethylenetramine, methyl acetoacetate, dimethyl malonate esters, and mixtures thereof.

11. The gel of claim 10, wherein the at least one component reactive with at least one air pollutant is about 0.01 to about 20 wt % of the gel.

12. The gel of claim 1, wherein the gel further comprises a crosslinking agent.

13. The gel of claim 12, wherein the crosslinking is chosen from sodium chloride, magnesium chloride, potassium chloride, barium chloride, magnesium sulfate, sodium sulfate, potassium sulfate, potassium hydrogen sulfate, sodium carbonate, potassium carbonate, potassium hydrogen carbonate, sodium bicarbonate, magnesium carbonate, and mixtures thereof.

14. The gel of claim 12, wherein the crosslinking agent is about 0.01 to about 20 wt % of the gel.

15. A method of making the gel of claim 1, comprising:
    combining the at least one polymer, the at least one adsorbent, the at least one chelating agent, and the at least one component reactive with at least one air pollutant to form the gel.

16. A gel for removing air pollutants from air, comprising:
    about 1 to about 10 wt % of carrageenan;
    about 1 to about 10 wt % of porous silica;
    about 0.1 to about 5 wt % of potassium chloride;
    about 0.1 to about 5 wt % of sodium hexametaphosphate;
    about 0.1 to about 5 wt % of aminoethanesulfonic acid; and
    water.

17. A method of removing one or more air pollutants from air, comprising:
    contacting the gel of claim 1 with air.

18. A method of making an apparatus for removing one or more air pollutants from air, comprising applying the gel of claim 1 to a surface.

19. An apparatus for removing one or more air pollutants from air, comprising the gel of claim 1.

20. A gel for removing air pollutants from air, comprising:
    about 1 to about 30 wt % of acacia, gelatin, carrageenan, locust bean gum, konjac gum, xanthan gum, starch, cyclodextrin, sodium alginate, chitosan, carboxymethyl chitosan, polyvinyl alcohol, polyurea, or combinations thereof;
    about 1 to about 30 wt % of porous silica, zinc ricinoleate, polyacrylamide, activated carbon, a molecular sieve, or combinations thereof;
    about 0.1 to about 20 wt % of sodium chloride, magnesium chloride, potassium chloride, barium chloride, magnesium sulfate, sodium sulfate, potassium sulfate, potassium hydrogen sulfate, sodium carbonate, potassium carbonate, potassium hydrogen carbonate, sodium bicarbonate, magnesium carbonate, or combinations thereof;
    about 0.1 to about 20 wt % of sodium tripolyphosphate, sodium polyphosphate, sodium hexametaphosphate, sodium pyrophosphate, nitrilotriacetic acid, diethylene triamine pentaacetic acid, ethylene glycol-bis-(β-aminoethyl ether)-N, N-tetraacetic acid, tetrasodium vinoxy diphosphate, aminotrimethylene phosphonate, or combinations thereof;
    about 0.1 to about 20 wt % of 2-(diethanolamino) ethanesulfonic acid, aminoethanesulfonic acid, trimethylolmethylaminoethanesulfonic acid, N-(2-acetylamino)-2-aminoethanesulfonate, adipic acid dihydrazide, propionyl hydrazide, trimethylolaminomethane, ammonium sulfate, diethylenetriamine, triethylenetramine, methyl acetoacetate, dimethyl malonate esters, or combinations thereof; and
    water.

* * * * *